United States Patent

Zeman

[11] Patent Number: 5,292,073
[45] Date of Patent: Mar. 8, 1994

[54] IRRIGATION TUBES WITH THICKENED WALL SECTIONS

[76] Inventor: David Zeman, c/o Disco, P.O. Box 42040, Las Vegas, Nev. 89116

[21] Appl. No.: 918,613

[22] Filed: Jul. 27, 1992

Related U.S. Application Data

[63] Continuation-in-part of Ser. No. 409,005, Sep. 18, 1989, Pat. No. 5,141,360.

[51] Int. Cl.⁵ .................................................. B05B 1/20
[52] U.S. Cl. .................................. 239/542; 405/43; 138/119
[58] Field of Search ........................ 239/542, 547; 138/DIG. 11, 119; 405/43

[56] References Cited

U.S. PATENT DOCUMENTS

| | | | |
|---|---|---|---|
| 3,091,401 | 5/1963 | Hruby, Jr. | 239/547 X |
| 3,333,422 | 8/1967 | Neyland | 239/547 X |
| 3,508,587 | 4/1970 | Mauch | 138/119 |
| 3,606,166 | 9/1971 | Whear | 239/542 X |
| 3,648,895 | 3/1972 | Strazdins | 138/119 X |
| 3,779,468 | 12/1973 | Spencer | 239/547 X |
| 4,181,051 | 1/1980 | Drori | 239/547 X |
| 4,196,853 | 4/1980 | Delmer | 239/547 X |
| 4,246,936 | 1/1981 | Luz et al. | 239/547 X |
| 4,254,916 | 3/1981 | Havens et al. | 239/547 |
| 4,437,679 | 3/1984 | Campagnolo | 138/DIG. 11 X |

FOREIGN PATENT DOCUMENTS

| | | | |
|---|---|---|---|
| 136527 | 7/1979 | Fed. Rep. of Germany | 138/DIG. 11 |
| 978787 | 12/1982 | U.S.S.R. | 239/542 |
| 1412666 | 7/1988 | U.S.S.R. | 239/547 |
| 739606 | 11/1955 | United Kingdom | 239/547 |

*Primary Examiner*—David M. Mitchell
*Assistant Examiner*—William Grant

[57] ABSTRACT

The amount of water emitted from an elongated irrigation tube having a series of holes in its periphery can be decreased by forming an enlarged wall portion of the peripheral wall of the tube and locating the dispensing holes in this enlarged portion. Preferably the holes are located so as extend at an angle of less than 45° to the center of the tube.

3 Claims, 1 Drawing Sheet

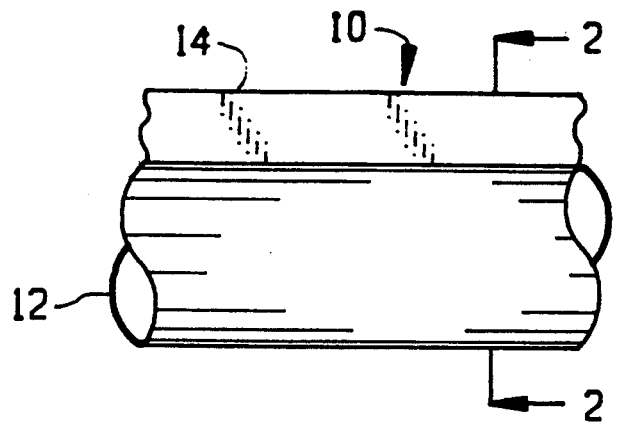
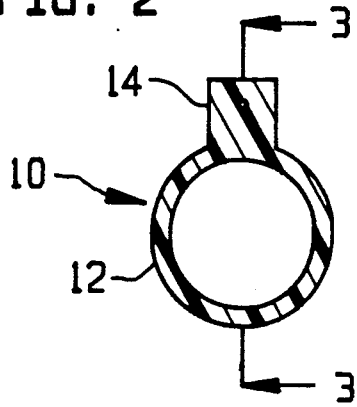
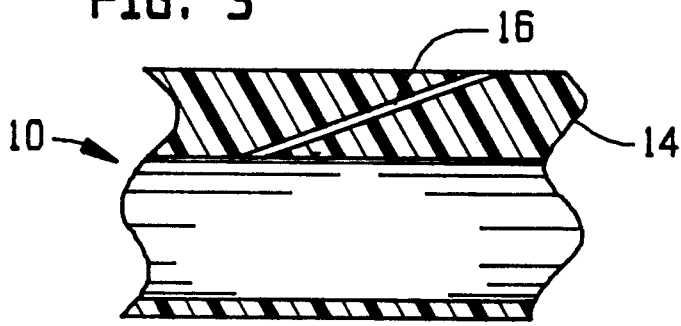
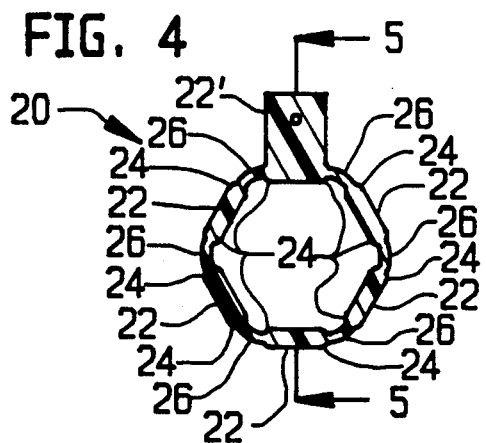
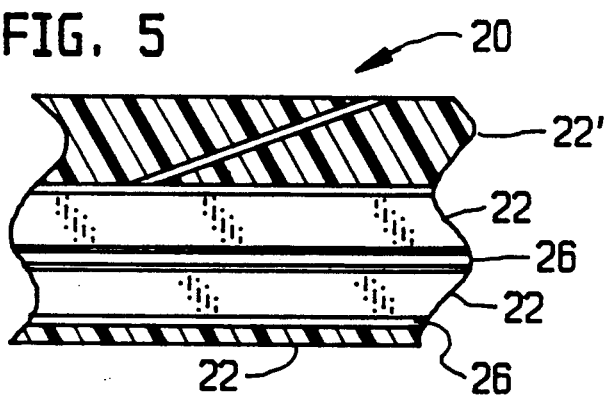

IRRIGATION TUBES WITH THICKENED WALL SECTIONS

Cross Reference to Related Application

This application is continuation-in-part of U.S. Pat. application Ser. No. 07/409,005 filed by Applicant herein on Sept. 9, 1989 entitled "Irrigation Tubing" and which was not elected in response to a restriction requirement in this other application. This parent application was abandoned and revived. The parent application has become U.S. Pat. No. 5,141,360. The entire disclosure of this parent application is incorporated herein by reference for the purpose of amplifying the disclosure of this specification.

FIELD OF THE INVENTION

The invention set forth in the specification pertains to plastic or polymer irrigation or tubing or tubes formed with sections of the walls of the walls of such tubes being thicker than the remainders of the walls of such tubes. Such thickened sections make it possible to use comparatively long dispensing holes in such sections and, depending upon the construction employed, make it possible to easily secure such tubes so that the dispensing holes are oriented in a desired direction.

BACKGROUND OF THE INVENTION

The significance of these latter factors is most easily explained by referring to common irrigation or watering tubes. These are usually cylindrical tubes in which a series of dispensing holes or openings are located so as to be spaced from one another in a series extending along the length of the tube. The walls in such tubes are normally as thin as possible without being so weak as to be apt to break under the internal pressures which such tubes are intended to contain as they are used. Such pressures can be referred to as "rated" pressures. While the use of such thin walls is desirable in minimizing the amount of material required to form a tube of a specific internal diameter and length it results in such tubes having comparatively thin walls.

This latter is considered disadvantageous because it tends to make it exceedingly difficult to form the holes in such tubes so that they are small enough to provide sufficient resistance to water flow so that the amount of water dispensed through such a hole during normal conditions of use will be as limited as may be desired for some agricultural and related applications. It is considered a practical impossibility to increase such resistance to flow by making such holes smaller than small laser drilled or burnt holes as are found in current irrigation tubes because it may not be possible to form such smaller holes and, if it is possible, it probably is not practical or economical to form them.

As a consequence of the effective limit to which the size of a dispensing hole in an irrigation tubing can be reduced a number of efforts have been made to develop specialized tube constructions and related devices used with irrigation tubing to limit the amount of water capable of being dispensed from an irrigation tube. Fortunately an understanding of the present invention does not require a consideration of all of such expedients. Many of them are based upon the principle that the longer the passage water has to pass through to be dispensed the greater the pressure drop across the ends of the passage and the less the amount of water emitted. This is related to the fact that the longer a piece of pipe is the greater the pressure required to achieve a specific flow through the pipe.

In the irrigation field such comparatively long passages have been achieved in a number of different ways. In some cases housings having passages which extend back and forth between the sides of the housings are attached directly to an irrigation tube so that all water dispensed from the tube has to flow through such a housing. In other cases tubes have been formed so that opposed edges or surfaces of a strip of material used to form these tubes have been secured together to define comparatively long passages to retard the flow of water. While expedients of this type are considered effective it is not considered that they are as economic as other constructions in which small conventional cylindrical or specialized holes leading through the wall of a tube are used to constrict water flow.

Unfortunately the amount which even the smallest holes capable of being created in the wall of a watering or irrigation tube will not provide enough resistance to fluid flow so as to restrict such flow to the very limited amounts desired for many applications. Efforts to increase such resistance to flow by slanting the holes in accordance with the ancient method employed during Roman civilization to influence the flow from an irrigation canal are not normally satisfactory with present day plastic or polymer tubes because the walls of such tubes are so thin that there is simply not space enough to slant a dispensing hole so as to gain any significant length of the hole.

Common plastic or polymer irrigation tubes as used at the present also can be undesirable in some applications for another, quite different reason. In some applications it is desired to be able to orient the dispensing holes in such tubes so that they face a specific direction. Thus, in some cases it would be desirable to hold an irrigation tube used to dispense limited quantities of water so that the water would not tend to run down the length of the tube as it seeps from the holes in such a tube but instead would tend to drip from the tube adjacent to such holes onto the ground adjacent to such holes. Although cylindrical irrigation tubes can be held in a desired orientation it is rather difficult to accomplish this result.

BRIEF SUMMARY OF THE INVENTION

It is considered that it will be apparent from the preceding discussion that the invention is intended to provide new and improved irrigation or watering tubes. More specifically it is intended to provide tubing for such use which is constructed so that the dispensing holes in such tubing are sufficiently long to obtain a desired pressure drop limiting the amount of water dispensed so that such an amount is less than that dispensed from a normal irrigation tube. It is also intended to provide irrigation tubes as described which are also constructed so that they can be easily and conveniently held in any normally desired orientation by simple clips or other holders.

Objectives of the present invention are to provide tubing as described which may be easily and conveniently manufactured at a comparatively nominal cost which is only slightly greater than the cost of manufacturing conventional cylindrical irrigation tubing, which may be easily and conveniently installed and used and which is capable of being used over comparatively long periods without significant attention.

In accordance with this invention the broadest of these objectives are achieved by providing an elongated irrigation tube having a peripheral wall in which there are a series of holes leading from the interior of the tube to the exterior thereof in which the improvement comprises: all of said holes being located in an elongated portion of said peripheral wall which is thicker than the remainder of said peripheral wall and said holes being slanted relative to the center of said tube so as to be longer than if they extended radially from the center of said tube in order to provide increased length to said holes.

Unfortunately a short statement such as the preceding sentence cannot be expected to fully indicate or even suggest all of the features of the invention. Thus, this statement does not mention the fact that it is preferred to form a tube in accordance with the invention so that the thicker portion of the tube is a rib or flange extending from the remainder of the tube which can be used in holding the tube so that it is oriented in a desired manner. These and other details of the invention are best more fully explained with reference to the remainder of this specification and the accompanying drawing.

BRIEF DESCRIPTION OF THE DRAWING

Because of the nature of the present invention it is best more fully explained with reference to this drawing in which:

FIG. 1 is a side elevational view of a short length of an irrigation tube in accordance with the invention which is preferred when coiling and shipment of significant lengths of the tube is not a significant factor in connection with the use of the tubing;

FIG. 2 is cross-sectional view taken at line 2—2 in FIG. 1;

FIG. 3 is a cross-sectional view taken at line 3—3 of FIG. 2;

FIG. 4 is a cross-sectional view corresponding to FIG. 2 of a modified tube in accordance with the invention which is considered preferable when the tube has to be coiled and manipulated after being manufactured and before it is used;

FIG. 5 is a cross-sectional view taken at line 5—5 of FIG. 4;

FIG. 6 is a cross-sectional view corresponding to FIG. 2 of a further modified tube in accordance with the invention; and FIG. 7 is a cross-sectional view taken at line 7—7 of FIG. 6.

No effort has been made in teh drawing and in the remainder of this specification to illustrate or describe all theoretically possible permutations and combinations and modification of the features of the invention which are within the skill of an ordinary worker in the field of the design of tubing used for plant watering or irrigation purposes. For this reason the invention is to be considered as being limited solely by the accompanying claims forming a part of this specification and is not to be considered as being limited to items which appear precisely as illustrated in the drawings.

DETAILED DESCRIPTION OF THE PREFERRED EMBODIMENTS

In the initial three figures of the drawing there is shown a short length of an elongated watering or irrigation tube or tubing 10 in accordance with the invention. This tube 10 is preferably formed in accordance with conventional practice by the extrusion of a known organic plastic or polymer composition which is somewhat flexible and resilient when present in a thin member having a comparatively limited thickness but which is relatively stiff and inflexible when present in a member having a significantly greater thickness. Such compositions are well known in the field of the invention.

As formed the tube 10 includes a conventional comparatively thin cylindrical wall 12 which is sufficiently thick so that it will not rupture when the interior pressure within the tube 10 is within an intended range as the tube 10 is used. When common, conventional polymers are used to form the tube 10 in accordance with the usual practice in the field of the invention the wall 12 will be so thin that it is impossible to form a dispensing hole (not shown) in it which is significantly longer than a conventional radial hole (not shown). In accordance with this invention an enlarged rib or flange 14 is formed integrally with the wall 12 so as to extend outwardly therefrom in a radial manner. This flange 14 extends along the entire length of the tube 10.

The flange 14 is provided on the tube 10 for two purposes. One is to provide room for a slanted hole 16 in the flange 14 which is sufficiently greater in length than the length of a radial hole (not shown) so as to provide significant resistance to water flow. Such resistance should be sufficient so that less water will be dispensed through the hole 16 than would be dispensed through a conventionally extending radial hole of the same cross-sectional dimension passing through the flange 14 under conditions such that there is no current flowing in the tube 10.

Currently it is considered that the angle of the hole 16 relative to the center of the tube 10 should not be a mere token departure from 90°, but instead should be at least 45° so as to achieve a significant resistance to water flow over that provided by a radially extending hole (not shown). Of course, the less such an angle the greater the resistance to fluid flow occurring as the result of the length of the hole 16. Because of manufacturing difficulties it is presently considered that this angle should not normally be less than about 8° from the length of the tube although it is possible to form holes having a slightly less angle in a member such as the flange 14.

The precise flow through a hole 16 will also vary depending upon the cross-sectional configuration of this hole 16. One advantage of the present invention is that it makes it possible to form the hole 16 of a conventional cylindrical cross-sectional configuration using known techniques. Thus, satisfactory results can be achieved using a conventional laser to "drill" or burn a substantially cylindrical hole 16 of a desired length in accordance with established practice. If desired, however, the hole 16 can be of a specialized cross-sectional configuration designed to impede or restrict water flow. Configurations of this type are shown in the copending U.S. patent application Ser. No. 07/919,750, filed Jul. 27, 1992 entitled "Irrigation Tubing With Improved Discharge Holes". The entire disclosure of this copending application is incorporated herein by reference.

The second purpose for the flange 14 is to provide a flange or rib on the exterior of the tube 10 which can be conveniently used in orienting the tube 10 as the holes 16 are being drilled or as the tube 10 is printed or otherwise processed and in orienting the holes 16 so that they are pointed in a desired direction in connection with the discharge of water. This flange 14 is sufficiently large so that it will conveniently fit into a notch or the like to prevent twisting or rotation of the tube 10 as and after it is installed in a specific location. It also is sufficiently large so that it can normally be engaged by a clip or the like for the same purpose.

In FIGS. 4 and 5 a modified tube 20 in accordance with the invention is shown. This modified tube 20 has a series of flat, relatively rigid, peripheral, elongated panels 22 joined at their adjacent edges 24 by small, flexible, line like areas 26 serving more or less as hinges so as to enable the entire tube to be manipulated between an essentially flat, folded configuration as it is coiled and otherwise manipulated and an open or expanded configuration substantially as illustrated. This type of tube 20 is more fully set forth in the copending U.S. patent application Ser. No. 07/919,751, filed Jul. 27, 1992, now U.S. Pat. No. 5,224,796, entitled "Flat Sided Irrigation Tubing". The entire disclosure of this copending application is incorporated herein by reference. In the tube 20 one of the panels 22 as designated by the numeral 22' is significantly thicker than the other panels 22 so as to be capable of serving the same function as the flange 14. Another embodiment of this tubing structure is shown in FIGS. 6 and 7. This tubing structure 30 has a cylindrical exterior wall 32 surrounding an eccentric cylindrical interior wall 34 so as to create an elongated, thickened side region 36 which is sufficiently thick so as to be capable of containing an elongated hole 38 corresponding to the hole 16. This hole 38 preferably is the same as the hole 16 in every respect. In all other ways the tube 30 is the same as a conventional cylindrical plastic or polymer irrigation tube (not shown)

I claim:
1. An elongated irrigation tube comprising:
   a peripheral wall having an interior surface and an exterior surface, said wall defining the longitudinal direction of said tube;
   said wall being defined by a plurality of longitudinally oriented relatively thicker and more rigid panels having substantially parallel edges, said thicker panels having therebetween a peripheral wall portion which is thinner and more flexible and extends longitudinally to serve as hinges joining the edges of adjacent thicker and more rigid panels, two of said thinner peripheral wall sections being opposite each other in said peripheral wall so that said tube can fold relatively flat, one of said thicker and more rigid panels being thicker than the other rigid panels to form a flange;
   a plurality of irrigation holes formed in said flange spaced along the length thereof, said holes being at an acute angle with respect to the longitudinal direction of said tube.
2. An elongated irrigation tube as claimed in claim 1 wherein:
   all of said holes are located at an angle of about 8° to about 45° with respect to the longitudinal direction of said tube.
3. An elongated irrigation tube as claimed in claim 1 wherein:
   said elongated portion is a radially extending flange extending outwardly from the remainder of said tube sized to receive holders thereon.

* * * * *